United States Patent
Alben et al.

(10) Patent No.: US 7,466,316 B1
(45) Date of Patent: *Dec. 16, 2008

(54) APPARATUS, SYSTEM, AND METHOD FOR DISTRIBUTING WORK TO INTEGRATED HETEROGENEOUS PROCESSORS

(75) Inventors: Jonah M. Alben, San Jose, CA (US); Stephen D. Lew, Sunnyvale, CA (US); Paolo E. Sabella, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 11/012,390

(22) Filed: Dec. 14, 2004

(51) Int. Cl.
 G06F 15/00 (2006.01)
 G06F 15/16 (2006.01)
 G06F 15/80 (2006.01)
 G06F 13/14 (2006.01)
 G06F 15/76 (2006.01)
 G06F 9/44 (2006.01)
 G06T 1/00 (2006.01)
 G06T 1/20 (2006.01)
 G09G 5/39 (2006.01)
 G09G 5/36 (2006.01)

(52) U.S. Cl. ............... 345/502; 345/501; 345/504; 345/505; 345/506; 345/519; 345/535; 345/547; 345/554; 345/559; 712/2; 712/28; 717/100

(58) Field of Classification Search ............ 345/519, 345/502, 505, 506, 501, 504, 535, 547, 554, 345/559; 370/359; 710/7, 20, 22, 38, 51; 712/32, 33, 34, 35, 36, 2, 28; 717/100
See application file for complete search history.

(56) References Cited

U.S. PATENT DOCUMENTS

| | | | | |
|---|---|---|---|---|
| 5,625,379 | A * | 4/1997 | Reinert et al. | 345/604 |
| 5,659,706 | A | 8/1997 | Beard et al. | |
| 5,943,064 | A * | 8/1999 | Hong | 345/546 |
| 5,949,439 | A | 9/1999 | Ben-Yoseph et al. | 345/503 |
| 5,977,995 | A * | 11/1999 | Yassaie | 345/546 |
| 6,240,516 | B1 | 5/2001 | Vainsencher | |
| 6,297,835 | B1 | 10/2001 | Li | 345/600 |
| 6,347,344 | B1 * | 2/2002 | Baker et al. | 710/20 |
| 6,347,377 | B2 * | 2/2002 | Barbee | 713/300 |
| 6,411,333 | B1 | 6/2002 | Auld et al. | |
| 6,476,808 | B1 | 11/2002 | Kuo et al. | 345/422 |
| 6,651,082 | B1 | 11/2003 | Kawase et al. | 718/105 |
| 6,771,269 | B1 | 8/2004 | Radecki et al. | 345/503 |

(Continued)

OTHER PUBLICATIONS

Jonah M. Alben, et al., U.S. Appl. No. 11/012,461, filed Dec. 14, 2004, entitled "Apparatus, System, and Method for Integrated Heterogeneous Processors with Integrated Scheduler".

(Continued)

*Primary Examiner*—Ulka Chauhan
*Assistant Examiner*—Aaron M Guertin
(74) *Attorney, Agent, or Firm*—Cooley Godward Kronish LLP

(57) ABSTRACT

An integrated circuit includes at least two different types of processors, such as a graphics processor and a video processor. At least one operation is commonly by supported by two different types of processors. For each commonly supported operation that is scheduled, a decision is made to determine which type of processor will be selected to implement the operation.

20 Claims, 5 Drawing Sheets

U.S. PATENT DOCUMENTS

| | | |
|---|---|---|
| 7,027,056 B2 | 4/2006 | Koselj et al. ................. 345/519 |
| 7,143,225 B1 * | 11/2006 | Tischler et al. .............. 710/305 |
| 2003/0133042 A1 | 7/2003 | Lee et al. |
| 2004/0190617 A1 | 9/2004 | Shen et al. ............. 375/240.16 |
| 2005/0081182 A1 | 4/2005 | Minor et al. ................. 717/100 |
| 2005/0184993 A1 * | 8/2005 | Ludwin et al. .............. 345/502 |
| 2005/0190189 A1 | 9/2005 | Chefd'hotel et al. ........ 345/501 |
| 2005/0210472 A1 | 9/2005 | Accapadi et al. ............ 718/105 |
| 2006/0248286 A1 | 11/2006 | Scott et al. |

OTHER PUBLICATIONS

Jonah M. Alben, et al., U.S. Appl. No. 11/012,464, filed Dec. 14, 2004, entitled "Apparatus, System, and Method for Integrated Heterogeneous Processors."

* cited by examiner

APPARATUS, SYSTEM, AND METHOD FOR DISTRIBUTING WORK TO INTEGRATED HETEROGENEOUS PROCESSORS

FIELD OF THE INVENTION

The present invention is generally related to the integration of two or more different processors on a single integrated circuit. More particularly, the present invention is directed towards integrating a graphics processor and at least one other type of processor on a single integrated circuit and allocating work to the processors.

BACKGROUND OF THE INVENTION

Graphics systems commonly use a graphics processing unit (GPU) integrated circuit to process graphical images. A GPU is typically implemented as a vector processor that includes dedicated graphics hardware.

High performance GPUs tend to be comparatively complex integrated circuits having a large number of transistors. As a result, a GPU tends to occupy a comparatively large chip area and tends to consume a comparatively large amount of power.

A conventional high performance GPU has several drawbacks that are due, in part, to the fact that a GPU is highly specialized and is typically implemented as a high precision processor. One drawback is that there are certain types of operations that a GPU does not perform well. Additionally, a GPU consumes more power than desired, particularly for mobile applications where the GPU operates off of battery power.

There is also an increasing interest in using a GPU chip to perform other types of processing. As one example, there is increasing interest in using a GPU chip in a system that processes both graphics data and video data. For example, in media center computers, one computer system may include software applications for three-dimensional computer games, personal video recording, and other media applications.

Therefore what is desired is an apparatus, system, method, and computer program product for increasing the capabilities of a GPU.

SUMMARY OF THE INVENTION

An integrated circuit includes a graphics processor and a video processor. At least one operation is commonly supported by both processors. Operations that are commonly supported by both processors may be scheduled on either processor. In one embodiment a host selects which processor performs a commonly supported operation. The scheduling of work between two or more different types of processors may be made to achieve one or more different objectives, such as load balancing or power minimization.

One embodiment of a method of processing graphics data and video data in an integrated circuit having a graphics processor and a video processor wherein at least one type of operation is supported by both processors includes: receiving operations to be scheduled; determining processors that support each received operation to be scheduled; for an operation within a first class of operations supported by only one type of processor, scheduling execution on that type of processor; and for an operation within a second class of operations that is commonly supported by two or more types of processors, selecting one of the types of processors for executing the operation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
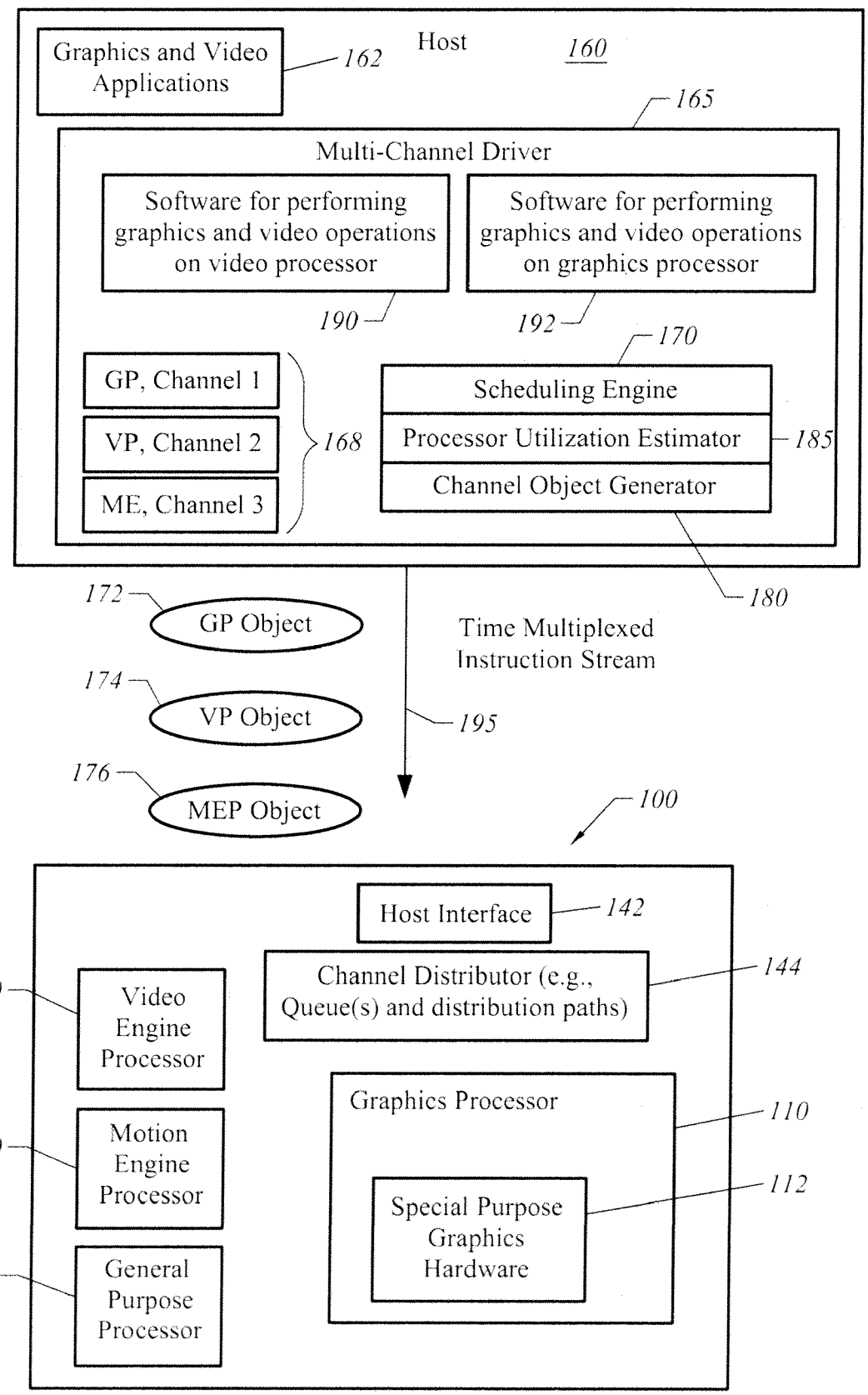
FIG. 1 is a block diagram of an integrated circuit with different types of processors in accordance with one embodiment of the present invention.

FIG. 1 is a block diagram illustrating a multi-tasking integrated circuit 100. Integrated circuit 100 has heterogeneous processors in that it has two or more different types of programmable processors 110, 120, 130, and 140 in accordance with one embodiment of the present invention. An exemplary application of integrated circuit 100 is for use in a system capable of processing both graphics data (e.g., two-dimensional and three-dimensional graphics) and video data, although it will be understood throughout the following discussion that the present invention is not limited to this exemplary application. Integrated circuit 100 includes conventional input and output (I/O) interfaces (not shown) for data, such as a video data I/O interface and a graphics data I/O interface.

One of the processors is a three-dimensional graphics processor (a 3d gfx processor) 110 having special purpose graphics hardware 112 that may be used for accelerating three-dimensional graphics. Special purpose graphics hardware 112 includes hardware designed primarily for the purpose of accelerating at least one type of graphics operation used in three-dimensional graphics. As an illustrative example, special purpose graphics hardware 112 may be implemented as a graphics pipeline. In one embodiment graphics hardware 112 includes at least one of the following types of dedicated hardware for accelerating graphics operations: dedicated hardware for performing vertex data lookup from arrays, dedicated hardware for performing triangle setup calculations, dedicated hardware for performing texture address calculations, dedicated hardware for performing texture filtering, and dedicated hardware for performing z testing.

As indicated by the relative size of graphics processor 110, graphics processor 110 may in some cases require substantial chip area to accommodate dedicated graphics hardware 112, such as a graphics pipeline with hardware stages for processing geometry data, fragment data, and pixel data. Graphics processor 110 may, for example, be implemented as a vector processor capable of high precision graphics calculations for three-dimensional graphics, such as 32 bit floating point calculations. Additionally, graphics processor 110 may be used for two-dimensional graphics calculations (e.g., background layers). Graphics processor 110 may, for example, receive commands in a graphics programming language, such as OpenGL™.

In one embodiment graphics processor 110 is a programmable processor that may be programmed to perform other types of calculations. This permits graphics processor 110 a limited capability to perform one or more operations used to process video data, such as scaling, de-interlacing, and decoding. However, there are limitations on the flexibility with which a programmable graphics processor may be used for performing non-graphics calculations. For example, the vector nature of graphics processor 110 and the limitations of conventional graphics languages may make it difficult to efficiently program graphics processor 110 to perform some types of operations used to process other types of data, such as video data. Additionally, a programmable graphics processor 110 is typically designed to operate with a precision much greater than that conventionally used to process video data, resulting in an unnecessary waste of power. As a result, while a programmable graphics processor 110 may be used to process other data, such as video data, the use of graphics processor 110 for processing other types of data besides graphics data may require more power or result in a lower performance than desired.

Integrated circuit 100 also includes at least one other type of processor. In one embodiment, integrated circuit 100 includes a video processor 120. Video processor 120 supports the processing of video data. For example, in one embodiment video processor 120 supports moving picture expert group (MPEG-2/4) operations, such as decoding, scaling, and de-interlacing operations. Video processor 120 may, for example, be implemented as a general purpose processor having at least some instructions customized for optimizing one or more video operations. MPEG-2 video data may be processed using an 8 bit integer processor. Consequently, in one embodiment video processor 120 is implemented as an 8 bit integer processor that receives commands in an assembly language.

While video processor 120 is optimized for performing video operations, it may also be programmed to process other types of data. In particular, some types of graphics operations can be performed in a general purpose processor. As one example, a video processor 120 based on a general purpose processor may be programmed to calculate background two-dimensional layers. However, the lack of dedicated hardware (i.e., a multi-stage graphics pipeline hardware) in video processor 120 and the lower precision of video processor 120 may make it impractical to calculate some types of graphics data with the same quality and performance as graphics processor 110. It will thus be understood that video processor 120 may be programmed to perform a limited range of graphics operations, although some of the more complex three-dimensional graphics operations may be impractical to calculate in video processor 120 with acceptable speed and quality.

Integrated circuit 100 may also include other types of general purpose processors adapted to perform designated functions. For example, integrated circuit 100 may include a motion engine processor 130 for performing motion calculations to support video processing. Additionally, a general purpose processor 140 may be included in integrated circuit 100 to support other types of processing, such as audio processing.

Each of the processors 110, 120, 130, and 140 can be understood as being specialized processors having a primary function that they are optimized to perform. However, at least one of the processors is adapted to have the secondary function of performing at least one class of operations performed by another processor. Note that there are tradeoffs associated with performing an operation in different types of processors. Each individual processor supporting a particular operation will have different processing attributes (e.g., power, data accuracy, data quality, speed, or other performance metrics). For example, a 32 bit graphics processor 110 will tend to consume more power and perform certain types of calculations with a higher precision than an 8 bit integer video processor 120. On the one hand, dedicated graphics hardware 112 in graphics processor 110 permits superior performance for calculating certain types of graphics data. On the other hand, certain types of video operations can be performed more directly and efficiently in the video processor because of the optimized instruction set in video processor 120. Thus, for the case of programmable processors 110, 120, 130, 140 optimized for different objectives, the most general case is that there will be certain operations that a particular processor is optimized to perform, some operations that it may be used instead of another processor to perform with some minor tradeoffs, some operations that it may be used instead of another processor to perform with substantial tradeoffs, and some operations which may be impractical or impossible to perform on the processor in light of other constraints (e.g., performance, quality, and speed).

Host 160 includes applications such as graphics and video applications 162. As a particular application runs it will generate requests for operations to be performed. Thus, a graphics application generates requests for graphics operations and a video application generates requests for video operations to be performed. In one embodiment a multi-channel driver 165 includes a scheduling engine 170 and channel logic 168 for scheduling operations to be performed on the processors. A channel represents an instruction stream for a processor such that there is one channel per processor. For example a graphics processor (GP) channel represents the instructions stream for graphics processor 110, a video processor (VP) channel represents the instruction stream for video processor 120, and a motion engine processor (MEP) channel represents the instruction stream for motion engine processor 130.

In one embodiment, at least one of the commands to two or more different processors, such as the graphics processor and the video processor, are compatible to permit commands to be scheduled on any processor supporting the command. As described below in more detail, this permits commands to be scheduled to different processors to achieve a variety of different operating objectives, such as load balancing and power minimization.

Channel object generator 180 instantiates an object for the destination processor to perform the operation. An object represents an operation assigned to a particular destination processor and includes the instruction or instructions required to execute the operation. Thus, a graphics object 172 is instantiated for an operation to be performed on graphics processor 110, a video processor object 174 is instantiated for an operation to be performed on video processor 120, and a motion engine processor object 176 is instantiated for an operation to be performed on motion engine processor 130. In one embodiment, semaphores are used whenever communication between channels is required. Since each processor may utilize a different language to perform an operation, in one embodiment driver 165 has available to it software for performing operations on all processors that support a particular operation. Thus for example, driver 165 has access to software 190 for performing graphics and video operations on video processor 120 and software 192 for performing graphics and video operations on graphics processor 110.

In one embodiment, objects 172, 174, and 176 are time multiplexed (time sliced) into a single multi-channel instruction stream 195. For the case that the host is located off-chip, bandwidth and pin limitations favor generating a single serial multi-channel instruction stream 195 for all of the channels. This may be achieved using a time division (time slicing) multiplexing technique in which the host outputs a time multiplexed instruction stream in which objects for different processors are issued in a sequence, e.g., a graphics processor object 172, then a video processor object 174, and so on.

Integrated circuit 100 may include a host interface 142 and channel distributor 144 to receive a time multiplexed instruction stream 195 and distribute individual (de-multiplexed) instruction streams to each destination processor. Channel distributor 144 may, for example, include one or more queues to queue instructions for incoming objects along with distribution paths to recognize and distribute objects to destination processors. Note that in one embodiment at least some of the area intensive latency first in first out (FIFO) buffers in host interface 142 and channel distributor 144 are shared by the processors, which provides a benefit in terms of reducing the cost of manufacturing integrated circuit 100.

Scheduling engine 170 determines the number of different types of operations that need to be scheduled and utilizes information indicative of processor utilization to allocate operations to the processors. For example, scheduling engine 170 may maintain a list of a batch of one or more operations received from the host that need to be scheduled along with information identifying operations that are supported by each of the different processors. At any one point in time, the distribution of different types of operations that need to be scheduled may change. This is due, in part, to the fact that the load of video data and graphics data that needs to be processed will tend to vary over time depending on the type of application that the host is running and the operations that the application requires. For example, a three-dimensional computer game is likely to generate a high demand for processing graphics data whereas a personal video recorder application is likely to generate a high demand for processing video.

In one embodiment, scheduling engine 170 has an associated processor utilization estimator 185. Processor utilization estimator 185 estimates the utilization of each processor based, for example, on the number of operations of different types that have been recently issued to each processor. The estimate of utilization may then be used to assign an operation to a lesser-utilized processor, which improves overall processor utilization and hence speed. For example, if the scheduling engine 170 has recently issued a sequence of instructions for one processor that are comparatively time consuming it may assume that the destination processor which has received time consuming operations is fully utilized and schedule the next operation on another processor. In the simplest case, scheduling engine 170 utilizes destination information of the latest previously issued operation as an indicator that the destination processor is busy such that overall processor utilization would be improved by issuing the next instruction to a different processor.

In one embodiment, scheduling engine 170 utilizes a round robin scheme to assign operations to each processor. For example, for a current list of operations that need to be scheduled, scheduling engine 170 may determine processors supporting the operations and generate a round robin scheduling order that attempts to feed work to each processor in a cyclic order selected to keep each processor as fully utilized as possible, i.e., to balance the load across the processors. A modification of round-robin scheduling is work-share scheduling, in which the time to execute an operation in a particular processor is taken into account. Thus, in work sharing scheduling, a scheduling order is selected to attempt to share work as evenly as possible by taking into account the length of time required to execute operations in destination processors.

Scheduling engine 170 also accounts for any other scheduling objectives. In particular, in some cases it may be desirable for scheduling engine 170 to have different modes of operation besides optimizing processor utilization. For example, if maintaining average power consumption below a pre-selected threshold is an objective, scheduling engine 170 may place a priority on scheduling operations on lower-power processors to reduce power consumption (e.g., in a low power mode using the video processor 120 instead of the graphics processor 110 whenever consistent with other objectives, such as quality and speed constraints). If quality is an objective, scheduling engine 170 may place a priority on scheduling work to the processor capable of performing the highest quality output consistent with other objectives (e.g., in a high quality mode implementing graphics operations on graphics processor 110). It will be understood that scheduler 170 may use a multi-variable optimization technique to select a scheduling order for scheduling modes when two or more different parameters need to be taken into account. Additionally, since the processing of different operations will tend to involve a different set of tradeoffs, it will be understood that scheduler 170 may by programmed to perform a different scheduling optimization for each operation (e.g., a scaling operation, which is comparatively simple on a graphics processor, may have a different scheduling optimization than a more complex de-interlacing or decoding operation). As an illustrative example, scheduler 170 may include one or more rules to perform a scheduling optimization for each commonly supported operation in each scheduling mode.

Figure 2:
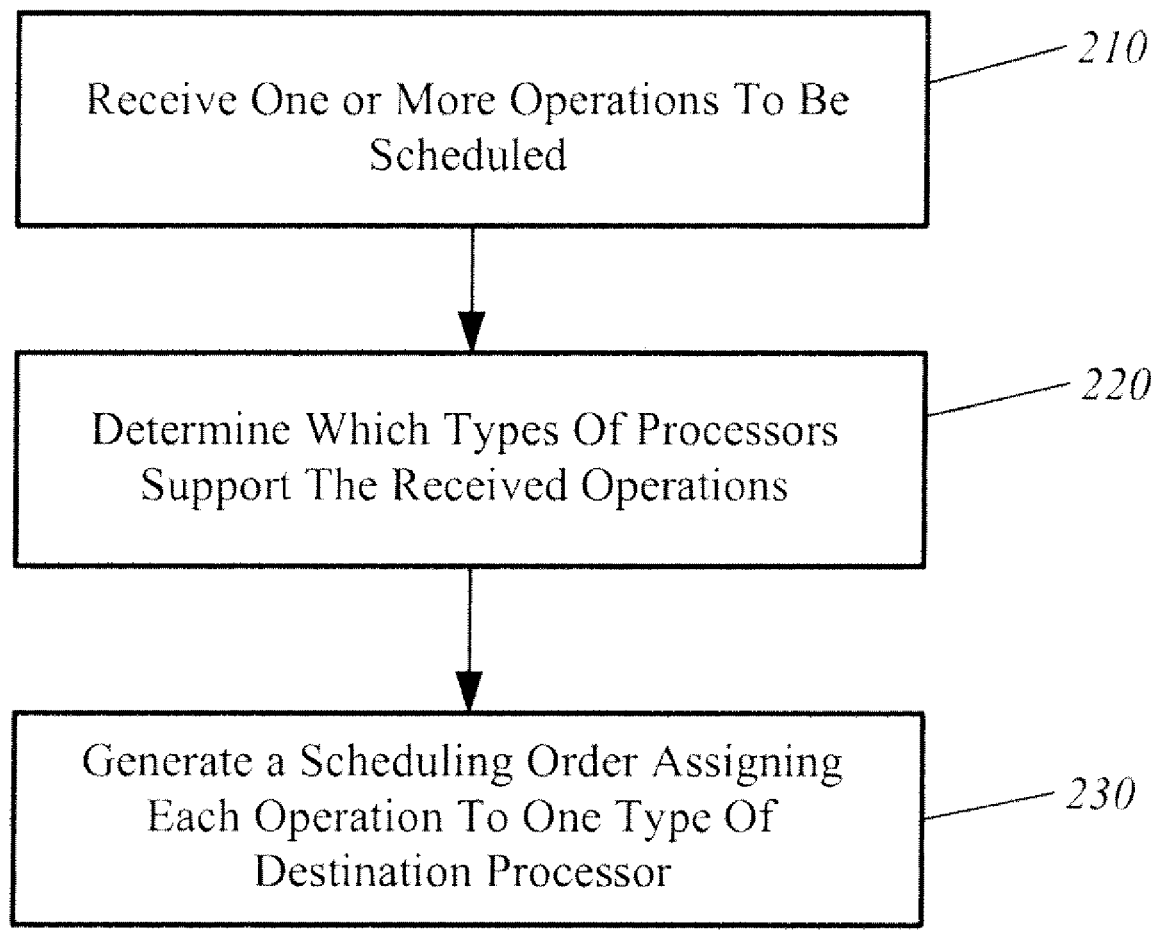
FIG. 2 is a flow chart illustrating a scheduling process in accordance with one embodiment of the present invention.

FIG. 2 is a flow chart illustrating a method of multi-tasking with different types of processors. Scheduling engine 170 receives 210 requests for operations to be performed. Scheduling engine then determines 220 which processors 110, 120, 130, and 140 support the operations and assigns each operation to one processor. As previously described, at least one operation is commonly supported by two or more processors. However some operations may be capable of being performed in only one of the processors (e.g., complex three-dimensional graphics in graphics processor 110). Scheduling engine 170 then generates 230 a scheduling order assigning each operation to one type of destination processor that supports the operation.

The load balancing modes provide several benefits. In one embodiment of a load balancing mode, for example, work may be scheduled on the different processors to attempt to keep all of the processors as fully utilized as possible in order to prevent an individual processor from becoming backed up with work. For example, suppose that at a given point in time that the graphics processor 110 has a comparatively high utilization while the video processor 120 is comparatively idle. In this example, processor utilization (and throughput) is improved by scheduling for execution on video processor 110 at least some of the operations that would conventionally be performed on graphics processor 110, such as a calculation for background two-dimensional layers. Conversely, suppose that at a particular point in time that graphics processor 110 is comparatively idle whereas video processor 110 has a high utilization. In this example, processor utilization and throughput is improved by scheduling for execution on graphics processor 110 operations that would conventionally be performed in a video processor, such as scaling or de-interlacing operations.

In another example of a load balancing mode, tradeoffs between quality and processor utilization are taken into account. In this embodiment, work is preferentially assigned to the processor capable of performing the highest quality calculation and load-balancing is scheduled when the preferred processor is unable to process all of the work assigned to it with a pre-selected throughput, such as during time intervals of peak demand on the preferred processor. For example, a default mode may include assigning video processor 120 as the preferred processor for video processing tasks unless an indicator of peak demand exceeds a pre-selected threshold. For example, scheduling engine 170 may detect when it has assigned a certain number of operations to video processor 120 and then switch to a load-balancing mode in which at least some operations that would ordinarily be assigned to video processor 120 are offloaded to the other processors.

As previously described, each particular operation will tend to have its own set of tradeoffs in regard to scheduling the operation from its primary processor to another processor capable of performing the operation. Thus, operations that are candidates for load-balancing may be considered on an operation-by-operation basis based on tradeoff criteria. In one embodiment of a load balancing algorithm, scheduler 170 selects for load balancing only a subset of all possible operations that may be performed on two or more processors for which scheduling the operation on a secondary processor results in a tradeoff that is within pre-selected constraints. Thus, for example, in a high quality mode scheduler 170 may select for load balancing only a subset of operations that would not result in a decrease in processing quality below some quality level.

In yet another example of a load-balancing mode, work is assigned to the different processors based on an operational mode of a device that integrated circuit 100 is used in. In particular, a high performance graphics processor 110 will tend to consume a comparatively large amount of power compared with a general purpose video processor 120. High power consumption generates heat that increases cooling requirements and which may also decrease the lifetime of integrated circuit 100. Additionally, high power consumption is a drawback in mobile applications where integrated circuit 100 is powered by a battery. Thus, another example of a load-balancing algorithm is to include power consumption in the tradeoffs made between scheduling work to the different processors. In a low power consumption mode a preference could be made to assigning processing operations to the processor capable of performing the operation with the smallest power consumption. For example, in a low power mode operations could be preferentially scheduled for video processor 120 instead of graphics processor 110 in order to reduce power consumption or heat dissipation.

It will thus be understood that in the most general case that decisions for scheduling work on processors 110, 120, 130, and 140 may be based on a combination of quality, power, processor utilization, performance, and operational mode considerations. The criteria for scheduling work on processors 110, 120, 130, and 140 may also be used to configure a single integrated circuit 100 for use in different market segments by selecting a scheduling technique adapted for a particular application. For example, if integrated circuit 100 is used in a high performance desktop system, a load-balancing algorithm may be selected to achieve the highest throughput. In some applications, cooling of a graphics system is an issue. Conventional cooling may be inadequate or have drawbacks, such as a noisy fan. Thus, in an application in which cooling is an issue, the scheduling algorithm may assign work to reduce cooling requirements. As another example, if integrated circuit 100 is used in battery power device, such as a notebook computer, the scheduling algorithm may detect that the device is operating off of battery power and then schedule work to reduce power consumption.

Figure 3:
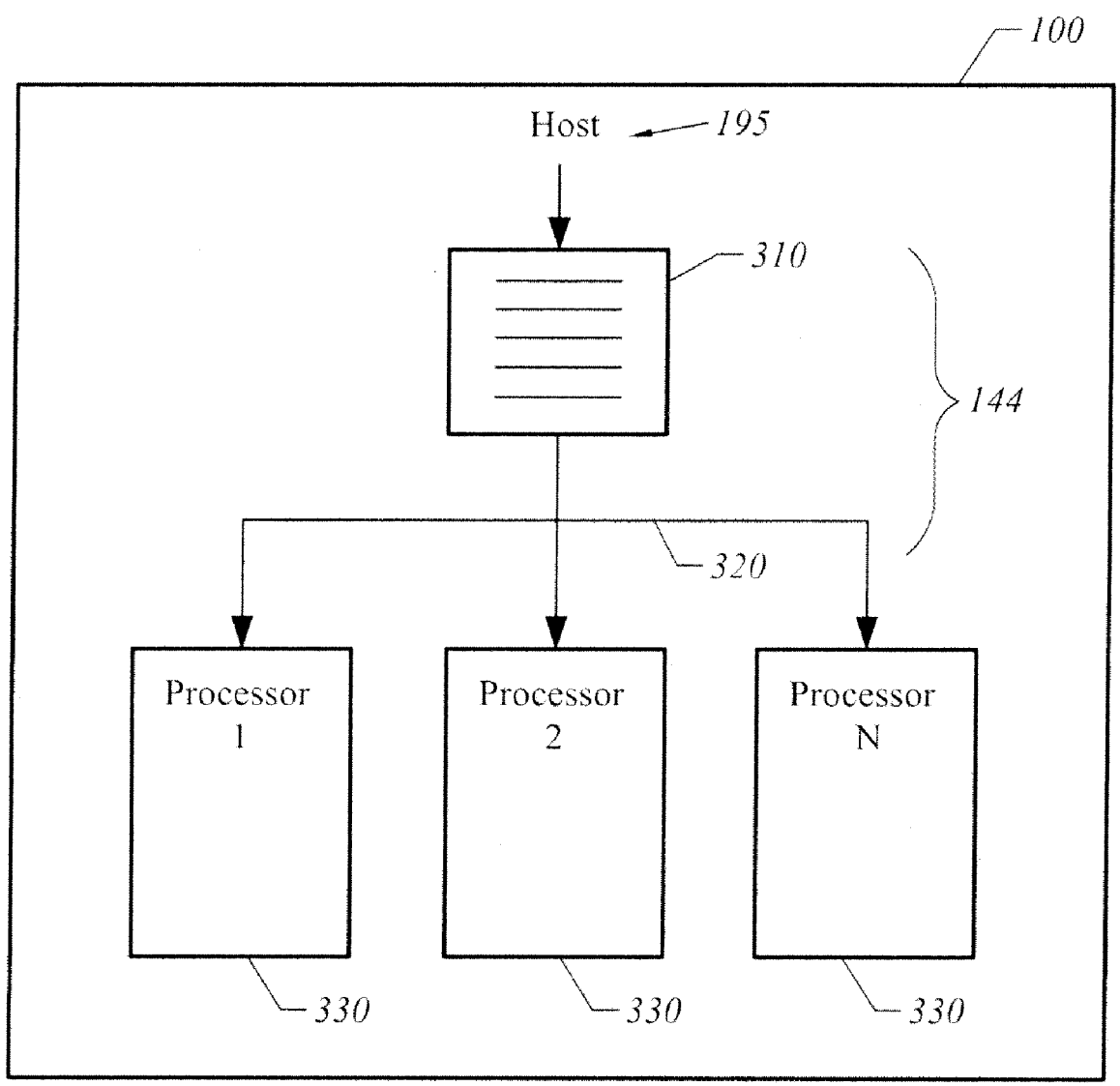
FIG. 3 is a block diagram of a portion of the integrated circuit of FIG. 1 for distributing instructions to different processors in accordance with one embodiment of the present invention.

FIG. 3 illustrates a first embodiment of a channel distributor 144. An input queue 310 receives the multi-channel command stream 195. In a first-in, first out (FIFO) embodiment the input queue 310 is a FIFO that buffers objects in a FIFO sequence. Instructions that correspond to objects progress through FIFO 310. When an object reaches the bottom of a FIFO queue 310 it is distributed by distribution paths 320 to its destination processor 330 as soon as the destination processor is capable of accepting the object. A drawback of the implementation of FIG. 3 is that if one of the processors 330 is processing a time-consuming operation, then an object for the processor that reaches the bottom of queue 310 will be stuck waiting for its destination processor to become available. This can result in objects at higher levels of queue 310 being blocked, which may cause one or more processors to become idle. Thus, a drawback of the embodiment of FIG. 3 is that there may be time intervals in which processor utilization is lower than desired because the progress of objects through queue 310 is blocked.

Figure 4:
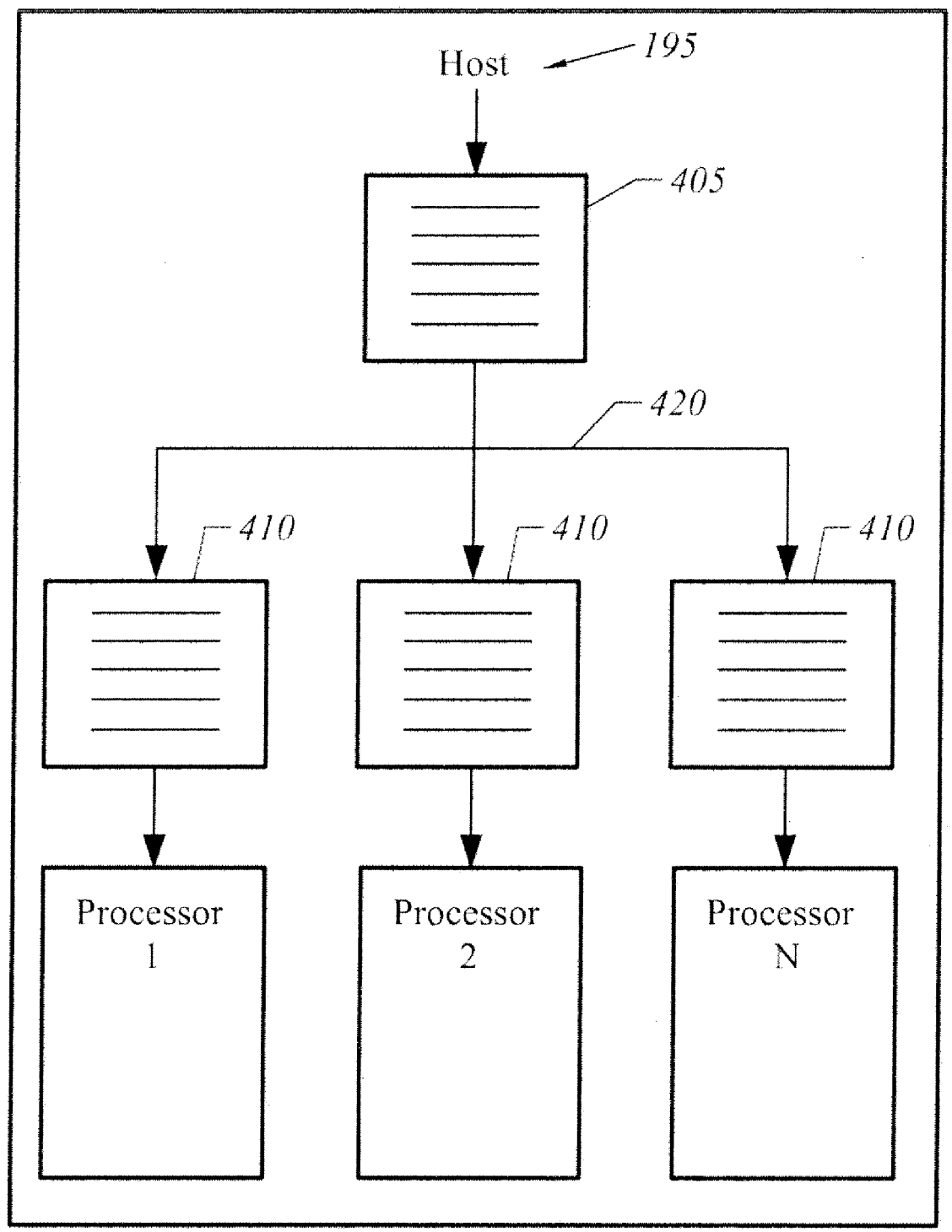
FIG. 4 is a block diagram of a portion of the integrated circuit of FIG. 1 for distributing instructions to different processors in accordance with one embodiment of the present invention.

FIG. 4 shows another embodiment of a channel distributor 144 for distributing work to the processors. In this embodiment, a serial queue 405 receives the multi-channel instruction stream 195. Additionally, each processor has its own dedicated destination queue 410. Instructions for objects flow into serial queue 405. When an object reaches the bottom of queue 405 it is then routed to the dedicated destination queue of its destination processor through distribution paths 420 as soon as a space is available in the dedicated destination queue 410.

This arrangement of queues 405 and 410 has the benefit that it reduces the frequency with which objects become blocked in serial queue 405, thereby improving the utilization of the processors. That is, all of the processors are capable of running in parallel unless one of the destination queues 410 becomes completely filled up and a new object for the same destination queue reaches the bottom of queue 405. This possibility can be reduced by including one or more rules in scheduler 170 to preemptively schedule the multi-tasking of operations to reduce the likelihood of the destination queue 410 being full and new instructions reaching the bottom of serial queue 405 for the same destination queue.

In one embodiment a channel switch is initiated by the scheduling engine 170 after an object is issued that is likely to require a comparatively large time to process. Thus, instead of issuing objects in an arbitrary order, after the issuance of an object likely to take a long time to process, a channel switch is performed by the host to issue one or more subsequent operations using objects on another channel. The channel switching may, for example, be continued for a sequence of subsequent new instructions based on the length of time that a destination processor is expected to be occupied processing a time consuming operation offset by the time associated with subsequent instructions to process through serial queue 305. Another way to describe the same concept is that the host includes one or more rules that instruct it when to preemptively stop issuing new objects on the same channel during a time interval when it is statistically possible that the issue of a new object for a destination queue would result in the object reaching the bottom of serial queue 405 at a time when its destination queue 410 was still full.

Figure 5:
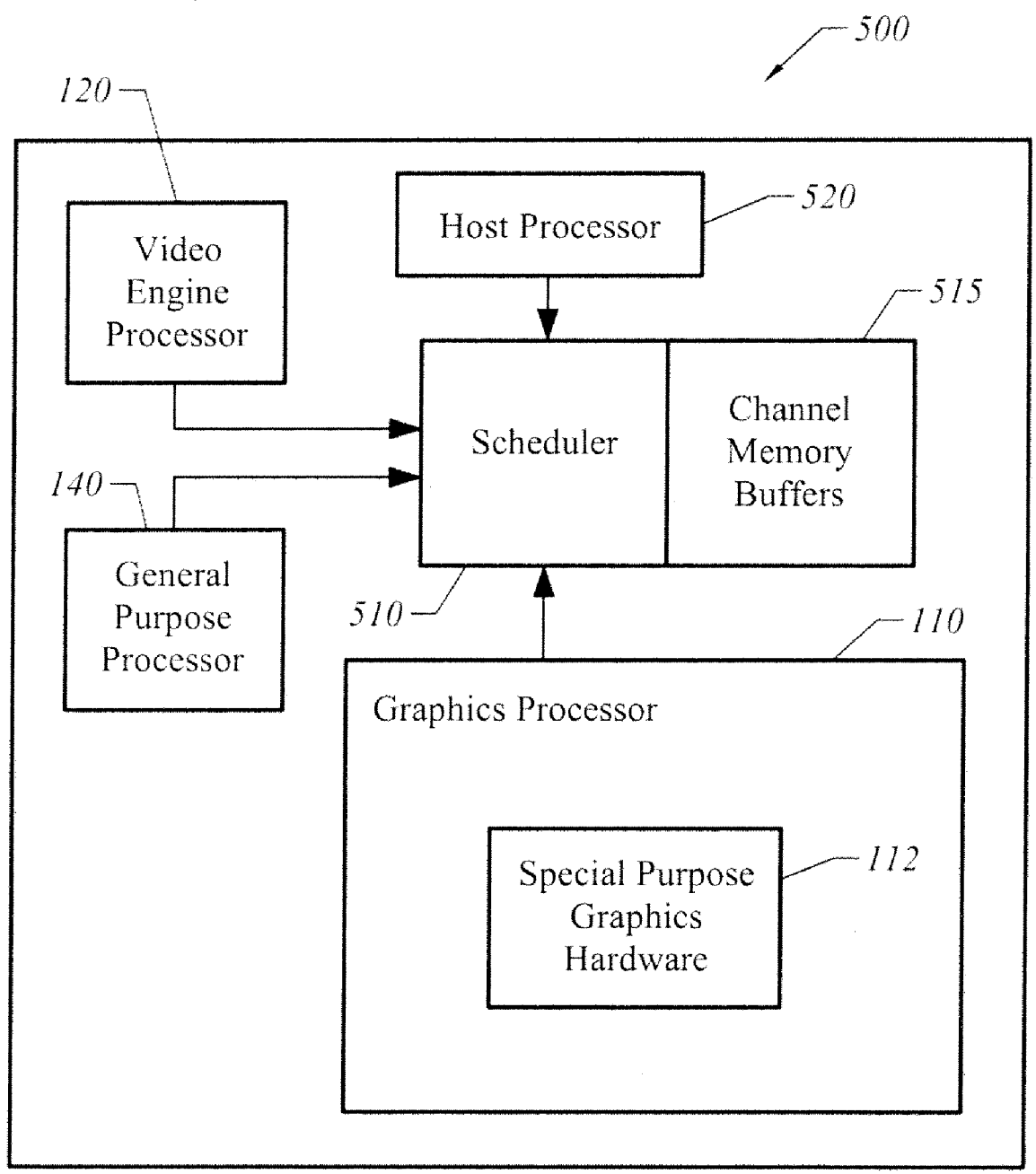
FIG. 5 is a block diagram of an integrated circuit with different types of processors and an integrated scheduling engine in accordance with one embodiment of the present invention.

FIG. 5 is block diagram of an integrated circuit 500 for scheduling operations on different types of processors 110, 120, and 140 in accordance with one embodiment of the present invention. An on-chip scheduler 510 is included in an integrated circuit 500 for scheduling operations in a plurality of processors, such as a graphics processor 110, video processor 120, and general purpose processor 140. In one embodiment the host processor 520 is also included on-chip in integrated circuit 500 and generates requests for operations to be performed.

One benefit of an on-chip host 520 and scheduler 510 is that the high bandwidth of internal buses permits each processor 110, 120, and 140 to receive commands in parallel on separate channels. In one embodiment put and get pointers are used to schedule and receive operations. Scheduler 510 writes a put pointer into channel memory buffers 515 to schedule an operation for a particular processor. Each processor, in turn, reads the memory buffers 515 using, for example, a get pointer. After a processor has finished an operation it accesses channel memory buffer 515 to receive commands for the next operation to be performed.

Another benefit of an on-chip scheduler 510 is that scheduler 510 has available to it real-time information on processor utilization. This can include, for example, information on the number of operations for each processor in memory buffers 515. Additionally, individual processors may directly report idle conditions to scheduler 510.

Additionally, in one embodiment each processor 110, 120, and 140 is configured to issue scheduling requests to scheduler 510. As one example, a scheduling request from an individual processor can include a request that an operation be rescheduled on another processor. For example, in response to detecting an exception, a processor may issue a request for the scheduler 510 to reschedule the operation on another processor. This permits a cooperative multi-tasking mode of operation in which both the processors cooperate with the scheduler to schedule operations. As an illustrative example, a video processor 120 may be assigned graphics operations that are close to the limit of the capabilities of the video processor. If an exception occurs in the processing of an operation, the video processor may request that the operation be rescheduled on the graphics processor 110.

An individual programmable processor, such as video processor 120, may use a conventional control interface. For example, one way to control a processor is to run binaries on it. For example, if one of the processors is an Intel x86 embedded microprocessor, executables may be launched on it. However, this approach has drawbacks, since it limits the capability to significantly change the underlying hardware between product generations and also has other drawbacks, such as making it more difficult for software to move between heterogeneous processors at run time. Additionally, another drawback is that conventional control techniques may impose a significant burden on higher level software and driver software in the host to control different types of processors.

In one embodiment, a class interface and subclasses are defined as control interfaces that greatly reduce the burden on high level software and driver software to control different types of processors. In this embodiment, hardware in an individual processor exposes a generic class interface (e.g., a range of generic methods). For example, a particular operation, such as blit, may be supported by the same class interface for implementation on a graphics processor, video processor, or other processor. In one embodiment, driver software in the host processor defines subclasses, where each subclass defines a specific type of operation (e.g., scaling) and assigns a meaningful function to each of the generic methods for the type of operation. Software in the host is then written to the subclass. Each processor includes processor specific software that implements the subclass on the specific processor. Thus, software operations written to a subclass may be implemented on any processor supporting the subclass. A benefit of this implementation is that high level software in the host doesn't need to know details about the different types of processors and the entire driver doesn't have to be aware of the details of the specific processor that it is using. Consequently, the burden on higher level software and the driver is reduced. Additionally, this implementation permits changes to the underlying hardware between generations and facilitates moving between different types of processors at run time.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of processing graphics data and video data in an integrated circuit having a first type of processor that is a three-dimensional graphics processor having dedicated graphics hardware including a graphics pipeline for processing graphics data including hardware stages for processing geometry data, fragment data and pixel data to perform graphics operations including triangle setup, texture address calculations, texture filtering, and z testing, the three-dimensional graphics processor being operative to perform graphics processing operations and also a subset of video processing operations, the integrated circuit also including a second type of processor that is a video processor to perform video processing operations with the video processor being further operative to perform a subset of two-dimensional graphics processing operations not requiring dedicated graphics hardware, the method comprising:
- receiving operations to be scheduled and scheduling operations based on processors that support each of four classes of operation;
- for an operation within a first class of graphics processing operations supported by only the three-dimensional graphics processor, scheduling execution on said three-dimensional graphics processor;
- for an operation within a second class of video processing operations supported by only the video processor, scheduling execution on said video processor;
- for an operation within a third class of graphics processing operations that is commonly supported by both types of processors, selecting only one of said types of processors for executing said graphics processing operation; and
- for an operation within a fourth class of video processing operations that is commonly supported by both types of processors, selecting only one of said types of processor for executing said video processing operation;
- the three-dimensional graphics processor and the video processor being separate processors having different processing capabilities, said video processor not including a version of the dedicated graphics hardware of the three-dimensional graphics processor and the video processor having a lower precision than the three-dimensional graphics processor such that said video processor is incapable of performing a full range of three-dimensional graphics operations.

2. The method of claim 1, further comprising:
scheduling operations in said third and fourth class for said graphics processor and said video processor according to a round robin protocol.

3. The method of claim 1, further comprising:
- generating an indicator of processor utilization of said three-dimensional graphics processor and said video processor based at least in part on previously scheduled instructions; and
- scheduling operations to balance a load across said three-dimensional graphics processor and said video processor.

4. The method of claim 3, wherein said generating an indicator comprises recording instances of issuing an instruction to a processor and said scheduling operations comprises scheduling a subsequent instruction to a different processor.

5. The method of claim 1, where each processor processes at least one commonly supported operation with a different quality, the method further comprising: scheduling operations to achieve a desired level of quality.

6. The method of claim 1, further comprising:
for each operation that is scheduled, instantiating an object representing that the operation is to be performed on a specified processor.

7. The method of claim 6, further comprising: time multiplexing objects for different processors onto a single instruction stream.

8. The method of claim 1, further comprising:
- for each processor, forming a channel representing an instruction stream for a corresponding processor to generate a plurality of channels;
- for each operation that is scheduled, assigning the operation to one processor; and time multiplexing said plurality of channels, whereby a single time multiplexed instruction stream is generated indicating operations to be performed by each processor.

9. The method of claim 8, further comprising: instantiating an object for each new operation that is scheduled, wherein an object indicates the processor that has been assigned an operation.

10. The method of claim 8, further comprising: utilizing semaphores to communicate between channels.

11. The method of claim 8, wherein said assigning further comprises:
- determining processors supporting said each operation;
- for operations supported by more than one processor, said assigning including selecting a processor to improve processor utilization.

12. The method of claim 11, wherein said selecting comprises: selecting processors according to a round-robin algorithm.

13. The method of claim 8, wherein said assigning comprises: selecting processors based at least in part on a power consumption criteria.

14. The method of claim 8, wherein said assigning comprises: selecting a processor based at least in part on a quality criteria.

15. An integrated circuit, comprising:
- a first type of processor that is a three-dimensional graphics processor having dedicated graphics hardware including a graphics pipeline for processing graphics data including hardware stages for processing geometry data, fragment data and pixel data to perform graphics operations including triangle setup, texture address calculations, texture filtering, and z testing, the graphics processor being operative to perform graphics processing operations and also a subset of video processing operations;
- a second type of processor that is a video processor to perform video processing operations with the video processor being further operative to perform a subset of two-dimensional graphics processing operations not requiring dedicated graphics hardware;
- a scheduler, said scheduler to schedule four different classes of operations based on the processors that support the operation including for an operation within a first class of graphics processing operations supported by only the three-dimensional graphics processor, scheduling execution on said three-dimensional graphics processor, for an operation within a second class of video processing operations supported by only the video processor, scheduling execution on said video processor, for an operation within a third class of graphics processing operations that is commonly supported by both types of processors, selecting only one of said types of processors for executing said graphics processing operation, and for an operation within a fourth class of video processing operations that is commonly supported by both types of processors, selecting only one of said types of processor for executing said video processing operation;
- the three-dimensional graphics processor and the video processor being separate processors having different processing capabilities, said video processor not including a version of the dedicated graphics hardware of the three-dimensional graphics processor and the video processor having a lower precision than the three-dimensional graphics processor such that said video processor is incapable of performing a full range of three-dimensional graphics operations.

16. The apparatus of claim 15, wherein said at least one scheduling rule comprises a load balancing rule for steering work to each of said at least two different types of processors.

17. The apparatus of claim 15, wherein said at least one scheduling rule comprises a power reduction rule for scheduling commonly supported operations to reduce power consumption in a low power mode.

18. The apparatus of claim 15, wherein said at least one scheduling rule comprises a quality rule for scheduling commonly supported operations to maintain a pre-selected quality metric.

19. An integrated circuit, comprising:
- a first type of processor that is a three-dimensional graphics processor having dedicated graphics hardware including a graphics pipeline for processing graphics data including hardware stages for processing geometry data, fragment data and pixel data to perform graphics operations including triangle setup, texture address calculations, texture filtering, and z testing, the graphics processor being operative to perform graphics processing operations and also a subset of video processing operations;
- a second type of processor that is a video processor to perform video processing operations with the video processor being further operative to perform a subset of two-dimensional graphics processing operations not requiring dedicated graphics hardware;
- a scheduler, said scheduler determining processors that support each operation and assigning each operation to one type of processor, wherein for said at least one commonly supported processing operation said scheduler selects one of said at least two different types of processors based on at least one scheduling rule including for an operation within a first class of graphics processing operations supported by only the three-dimensional graphics processor, scheduling execution on said three-dimensional graphics processor, for an operation within a second class of video processing operations supported by only the video processor, scheduling execution on said video processor, for an operation within a third class of operations that is commonly supported by both types of processors, selecting only one of said types of processors for executing the operation in the third class of operations;
- the three-dimensional graphics processor and the video processor being separate processors having different processing capabilities, said video processor not including a version of the dedicated graphics hardware of the three-dimensional graphics processor and the video processor having a lower precision than the three-dimensional graphics processor such that said video processor is incapable of performing a full range of three-dimensional graphics operations.

20. A method of processing graphics data and video data in an integrated circuit having a first type of processor that is a three-dimensional graphics processor having dedicated graphics hardware including a graphics pipeline for processing graphics data including hardware stages for processing geometry data, fragment data and pixel data to perform graphics operations including triangle setup, texture address calculations, texture filtering, and z testing, the graphics processor being operative to perform graphics processing operation and also a subset of video processing operations, the integrated circuit also including a second type of processor that is a video processor to perform video processing operations with the video processor being further operative to perform a subset of two-dimensional graphics processing operations not requiring dedicated graphics hardware, the method comprising:
- receiving operations to be scheduled;
- for an operation within a first class of graphics processing operations supported by only the three-dimensional graphics processor, scheduling execution on said three-dimensional graphics processor;
- for an operation within a second class of video processing operations supported by only the video processor, scheduling execution on said video processor;
- for an operation within a third class of operations that is commonly supported by both types of processors, selecting only one of said types of processors for executing said operation within said third class of operations;
- the three-dimensional graphics processor and the video processor being separate processors having different processing capabilities, said video processor not including a version of the dedicated graphics hardware of the three-dimensional graphics processor and the video processor having a lower precision than the three-dimensional graphics processor such that said video processor is incapable of performing a full range of three-dimensional graphics operations.

* * * * *